United States Patent [19]
Fedter et al.

[11] Patent Number: 4,770,541
[45] Date of Patent: Sep. 13, 1988

[54] HEAT RADIATION SENSING DEVICE

[75] Inventors: Horst Fedter, Bühlertal; Werner Grünwald, Gerlingen; Peter Nolting, Bühlertal; Claudio de la Prieta, Stuttgart; Kurt Schmid, Ditzingen-Schöckingen, all of Fed. Rep. of Germany

[73] Assignee: Robert Bosch GmbH, Stuttgart, Fed. Rep. of Germany

[21] Appl. No.: 41,139

[22] PCT Filed: Oct. 3, 1986

[86] PCT No.: PCT/DE86/00402
§ 371 Date: Apr. 14, 1987
§ 102(e) Date: Apr. 14, 1987

[87] PCT Pub. No.: WO87/02456
PCT Pub. Date: Apr. 23, 1987

[30] Foreign Application Priority Data
Oct. 10, 1985 [DE] Fed. Rep. of Germany ....... 3536133

[51] Int. Cl.$^4$ ........................... G01J 5/10; G01K 17/06
[52] U.S. Cl. ................................... 374/32; 250/352; 338/18
[58] Field of Search .................. 374/121, 126, 9, 32; 250/349, 352; 338/22 R, 18

[56] References Cited

U.S. PATENT DOCUMENTS

| | | | |
|---|---|---|---|
| 3,355,589 | 11/1967 | Clifford | 374/121 X |
| 3,745,360 | 7/1973 | Paul | 250/338 R |
| 4,001,586 | 1/1977 | Fraioli | 374/121 X |
| 4,164,869 | 8/1979 | Benzinger | 374/32 X |
| 4,463,262 | 7/1984 | Contreras | 250/349 |
| 4,522,511 | 6/1985 | Zimmerer | 374/32 |
| 4,544,441 | 10/1985 | Hartmann et al. | 250/338 R |
| 4,682,032 | 7/1987 | Barrett | 250/352 |
| 4,692,623 | 9/1987 | Roberts et al. | 374/32 X |

FOREIGN PATENT DOCUMENTS
0553974  9/1974  Switzerland.

OTHER PUBLICATIONS
Patent Abstracts of Japan, vol. 4, No. 62, [pp. 10, 544] 5/9/80, and #5,531,977 to Sangyo et al, 3/6/80 patent.

Primary Examiner—Daniel M. Yasich
Attorney, Agent, or Firm—Michael J. Striker

[57] ABSTRACT

A heat radiation sensing device is provided, which comprises two receiver surfaces which are exposed to the radiation, one of which comprises a high absorption ability with respect to the heat radiation by means of a black coloring, while the other has a low absorption ability by means of a covering which reflects the heat radiation. These two receiver surfaces consist of NTC resistor material and are combined to form a bridge circuit with two cermet resistors which are independent of temperature. The four resistors are applied to a ceramic substrate and are connected with conductor path which, in turn, end in the four required connections. The ceramic substrate is fixed in a frame which carries a covering which is pervious to heat radiation to a great degree and which, in turn, carries a layer having a window over one of the two NTC resistors the layer is made of a material which reflects the heat radiation to a great degree.

12 Claims, 1 Drawing Sheet

HEAT RADIATION SENSING DEVICE

BACKGROUND OF THE INVENTION

The invention relates to a heat radiation sensing device. Such a sensing device has already been disclosed, for example, in "Sensor zum Messen der Waermestrahlung an Arbeitsplaetzen," Technisches Messen, Ig. 51, 1984, Heft 6, 8. 213 ff, in which two receiver surfaces consisting of sheet copper are exposed to heat radiation, wherein each receiver sheet comprises a temperature sensing device, which is glued to the rear side, so that the different temperatures, which occur due the fact that one of the receiver sheets is blackened and the other gold-plated, can be measured directly with this sensing device. The entirety is accommodated in a housing consisting of brass. Because of the relatively complicated construction, such a sensing device is not suitable for large-series production, which is the case, for example, in a sensing device which is to be used in a motor vehicle in connection with an air conditioning system.

SUMMARY OF THE INVENTION

It is an object of this invention to provide an improved head radiation sensing device.

The heat radiation sensing device, according to the invention has the advantage that it is simple to produce and, therefore, is also suitable for large-series production, but is mechanically very stable. Moreover, it is small and light and can therefore be fixed at any required location, for example, by means of gluing. The arrangement provides a single measuring signal which can be used in a simple manner, for example, to control a shutter.

It is particularly advantageous that the covering, which is pervious to heat radiation, consist of a polyimide, e.g. a Kapton foil, which is provided with a thin gold layer on one side by means of the application of a gold resinate and subsequent heat treatment at 300° to 350° C. If it is provided that the ceramic substrate on which the resistors are located is fixed in the frame in such a way that only the edge of the substrate is supported on a corresponding projection of the frame and the remaining portion of the substrate is open, then a minimal effective heat capacity is achieved with good mechanical stability of the substrate.

DETAILED DESCRIPTION OF THE PREFERRED EMBODIMENT

Figure 1:
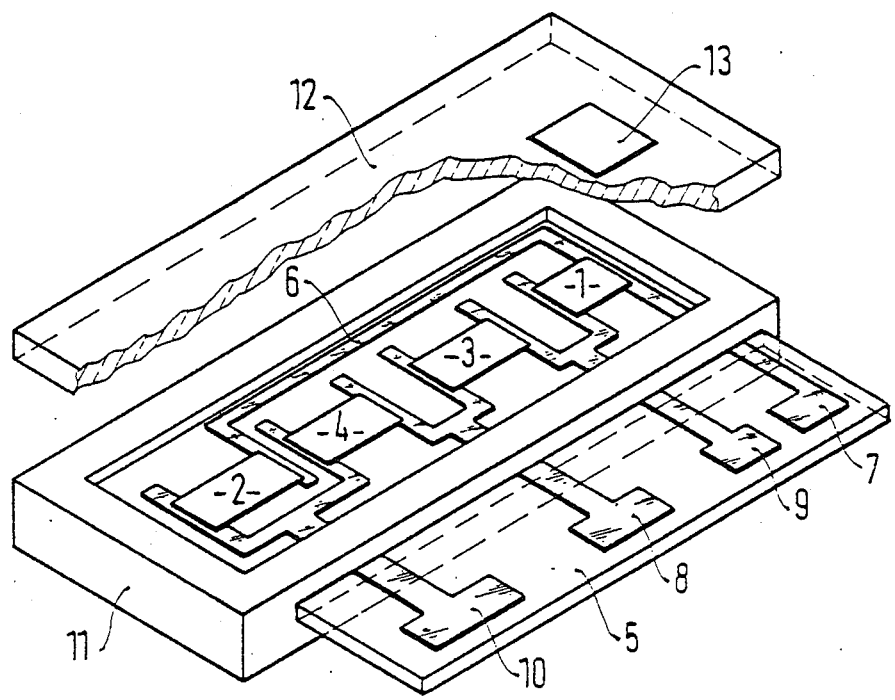
FIG. 1 shows a perspective view of the heat radiation sensing device.
Figure 2:
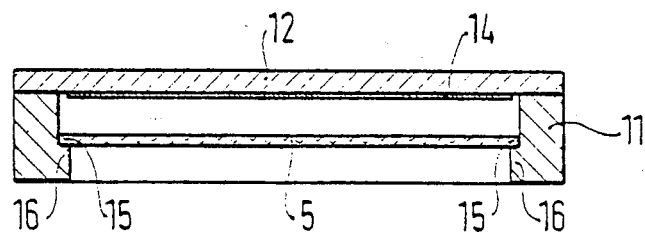
FIG. 2 shows a section through the device of FIG. 1.

The heat radiation sensing device includes a frame 11 of duroplastic plastics material in which is located the ceramic substrate 5, which comprises two radiation-sensitive resistors 1 and 2, as well as two resistors 3 and 4, which are not sensitive to temperature and are connected with one another via conductor paths 6 in the form of a bridge circuit. A portion of the ceramic substrate 5 projects from the frame 11 and, together with the conductor path terminals 7, 8, 9 and 10, forms the connection of the sensing device. Within the frame 11, the ceramic substrate, as shown in FIG. 2, is supported only by the edge 15 lying on a corresponding projection 16 of the frame 11 so that the major portion of the ceramic substrate 5 has no direct contact with the frame 11. A covering 12, which is pervious, in its entirety, to heat radiation and carries a layer 14 of noble metal on its rear side, is located on the frame 11 at a distance of approximately 1 mm from the ceramic substrate 5, wherein this layer comprises a window 13 over the radiation-dependent resistor 1. By means of this, the resistor 1, which carries a black lacquer layer, in addition, is exposed to the heat radiation, while this is not true of the second radiation-dependent resistor 2 because of the reflecting noble metal layer 14. The covering 12 can be either formed of a glass which is pervious to infrared radiation, e.g. Robax glass from the Schott company, or a polyimide foil, e.g. Kapton foil from the Dupont company.

In order to produce the heat radiation sensing device the conductor path pattern 6, with the connections 7, 8, 9 and 10, are first pressed on a thin ceramic plate, preferably made of aluminum oxide. The NTC resistors 1 and 2 are then pressed on, wherein a material is used, which is in the form of a paste and provides resistances which provide a rectangular resistance of 5 k$\Omega\square$ and a control constant B of 2200. The resistor paste NTC 135 from the Heraeus company, for example, is suitable for this purpose. Subsequently, the resistors 3 and 4, which are independent of temperature, are applied in the same way, wherein a cermet material is used which provides a rectangular resistance of 10 k$\Omega\square$, the cermet material with no. 1441 from the Dupont company. These resistor materials are applied to the ceramic substrate with a thickness such that a layer thickness of 8 $\mu$m remains after burning in in air at 850° C. This bridge circuit is now preferably adjusted to the cermet resistors 3 and 4 by means of a laser so that the bridge is currentless when a voltage is applied to the connections 7 and 8. Subsequently, the ceramic substrate 5 is inserted in the frame 11 and glued with the edges 15 on the projections 16. Before applying the covering 12, the latter is coated on one side with a noble metal layer consisting, for example, of gold, in that a layer of gold resinate is pressed on while leaving open a window 13 which subsequently leaves a gold layer when burning in, which gold layer adheres very favorably. When using glass, the burning in temperature is approximately 600° C.; if a Kapton foil is used, on which the gold layer, which is produced in this way, adheres in an excellent manner, the gold resinate is burned in at 300° to 350° C. The covering 12, with the gold layer 14, is then glued on to the frame 11 in such a way that the window 13 is made to lie directly over the resistor 1, wherein this resistor 1 was covered with a black mat lacquer paint prior to the assembly. A bridge voltage of 12V, for example, is now applied to the terminals 7 and 8, while an electric signal in the form of a potential can be taken off at the terminals 9 and 10 when there is heat radiation, since the resistor 1 changes as a function of the strength of the radiation to a greater degree than the resistor 2, which is protected from the heat radiation by means of the reflecting layer 14. The bridge is accordingly adjusted, and the aforementioned output signal, which is a measurement of the incident radiation, occurs at the terminals 9 and 10. It has been shown that the output signal in mV is practically a linear function of the radiation strength measured in W/m$^2$. This signal can now be used in a motor vehicle, for example, to actuate a shutter on the rear window when a determined radiation strength is exceeded; naturally, such a heat radiation sensing device can also be incorporated in the control of an air conditioning system of a motor vehicle.

It will be understood that each of the elements described above, or two or more together, may also find a useful application in other types of heat radiation sensing devices differing from the types described above.

While the invention has been illustrated and described as embodied in a heat radiation sensing device, it is not intended to be limited to the details shown, since various modifications and structural changes may be made without parting in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A heat radiation sensing device comprising a ceramic substrate; two resistors formed by receiver surfaces positioned on said substrate and exposed to heat radiation, one of the receiver surfaces (1) having a black coloring to provide thereon a high absorption ability with respect to heat radiation, said two receiver surfaces (1) and (2) being made of NTC resistor material; two cermet resistors (3) and (4), which are non-responsive to temperature and also positioned on said substrate, said two resistors forming with said cermet resistors on said substrate an electrical bridge circuit; conductor paths (6) provided on said substrate, said resistors (1) to (4) being connected with said conductor paths (6) a frame, said ceramic substrate (5) being fixed in said frame (11); and a covering (12) which covers said frame with said substrate therein and is pervious to heat radiation to a great degree and which carries a layer (14) on an inner surface thereof, which faces said substrate, said layer (14) being made of a material which reflects heat radiation to a great degree and being formed with a window which is positioned over said one of said receiver surfaces whereby another of said receiver surfaces is covered by said layer which reflects heat radiation.

2. Heat radiation sensing device according to claim 1, wherein said resistors of NTC resistor material have a resistance of 0.5 to 500 k$\Omega\square$ at room temperature and a control constant B of approximately 2,200, while said cermet resistors (3, 4) comprise a resistance of 0.5 to 500 k$\Omega\square$.

3. Heat radiation sensing device according to claim 1, wherein said covering (12) is made of glass.

4. Heat radiation sensing device according to claim 1, wherein said ceramic substrate (5) is fixed in said frame (11) in such a way that only an edge (15) of said substrate (5) is supported on a corresponding projection (16) of said frame.

5. Heat radiation sensing device according to claim 3, wherein said layer (14) is produced by means of pressing on said covering a layer of gold resinate and subsequent burning in at predetermined termperatures.

6. Heat radiation sensing device according to claim 5, said substrate being formed of glass, said burning of said layer is performed at approximately 600° C.

7. Heat radiation sensing device according to claim 5, said substrate being formed of polymide, said burning of said layer being performed at 300° to 350° C.

8. Heat radiation sensing device according to claim 1, wherein said layer (14), which reflects the heat radiation, is made of gold.

9. Heat radiation sensing device according to claim 8, wherein said layer (14) is produced by means of pressing on said covering a layer of platinum resinate and subsequent burning in at predetermined temperatures.

10. Heat radiation sensing device according to claim 1, wherein said covering (12) is made of polyimide.

11. Heat radiation sensing device according to claim 1, wherein said layer (14) which reflects the heat radiation is made of platinum.

12. Heat radiation sensing device according to claim 1, wherein said ceramic substrate (5) and said covering (12) are assembled so that they have no direct contact.

* * * * *